United States Patent [19]
Lindgren

[11] 3,739,794
[45] June 19, 1973

[54] METHOD AND APPARATUS FOR CONTINUOUSLY PREPARING A GEL

[75] Inventor: Mats E. G. Lindgren, Trangsund, Sweden

[73] Assignee: Gelco-Project Lindgren & Co., Handelsbolag, Stockholm, Sweden

[22] Filed: Sept. 10, 1971

[21] Appl. No.: 179,507

[30] Foreign Application Priority Data
Sept. 14, 1971  Sweden............................ 12466/71

[52] U.S. Cl. ................ 137/1, 137/604, 137/599.1, 169/1 A, 169/15
[51] Int. Cl............................................. A62c 5/16
[58] Field of Search .................. 137/1, 599.1, 604; 169/1 A, 15

[56] References Cited
UNITED STATES PATENTS

| | | |
|---|---|---|
| 3,642,072 | 2/1972 | Livingston ............................ 169/15 |
| 3,647,001 | 3/1972 | Livingston ............................ 169/1 A |
| 1,782,366 | 11/1930 | Palmer.................................... 169/15 |
| 2,953,160 | 9/1960 | Brazier............................ 137/604 X |
| 3,257,180 | 6/1966 | King.......................... 137/599.1 UX |

Primary Examiner—Robert G. Nilson
Attorney—Robert D. Flynn and Stephen H. Frishauf

[57] ABSTRACT

Method for continuously preparing a gel in which a liquid is mixed with a gelling agent in a hose or other conduit which serves to deliver the gel to the site at which it is used. The liquid and the gelling agent are supplied to the conduit in the proper proportions so that the gel is formed or completed approximate the output end of the conduit. The invention also includes apparatus for carrying out the specified method.

6 Claims, 1 Drawing Figure

Patented June 19, 1973  3,739,794
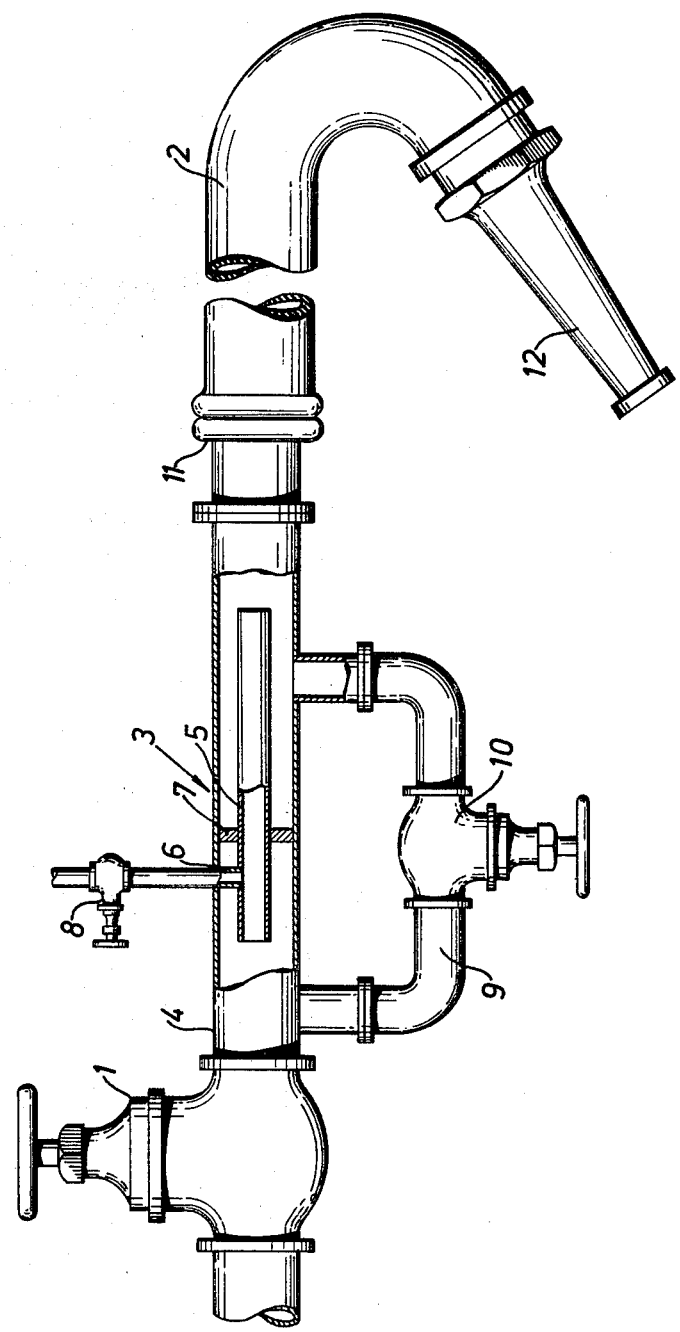

METHOD AND APPARATUS FOR CONTINUOUSLY PREPARING A GEL

This invention relates to a method and an apparatus for continuous preparation of a gel, especially a water gel intended for fire-extinguishing.

Water gels have proved to be highly effective as fire-fighting substances and are much more effective than water. The gel will easily adhere to a wall or the like in thick layers whereas upon flushing water on a wall only a thin film of water will adhere thereto. This means that the gel has considerably higher heat capacity and a better extinguishing effect on the fire and, furthermore, that a gel will be effective for much longer time.

In the past the problem was to find a gel which could be prepared sufficiently fast to be practically applicable as fire-fighting substance. One solution of this problem is described in Swedish Pat. No. 310,312 which discloses a gel well applicable for fire-fighting. This gel is prepared by mixing water with 0.1–10 percent of an organic gelling agent composed by a surface active polyethylene oxide derivative and a volatilizable hydrocarbon oil, the mixing ratio being such as to cause a gel having the desired consistence.

An apparatus for preparing such a water gel is disclosed in Swedish Pat. No. 317,875. This apparatus consists of a relatively bulky cylindrical vessel comprising a number of mixing chambers. It is fed with water and gelling agent separately and produces a finished gel. For practical reasons, this apparatus cannot be used in such cases where the fire-fighting substance has to be carried through hoses or the like as the apparatus then has to be inserted either in the first part of the hose or alternatively at the jet nozzle. In the first case the finished gel has to be carried through the hose which is unrealistic as it would result in a very great fall of a pressure in the hose. In the second case the gelling apparatus has to be carried by the fire man which would seriously interfere with his working capacity and, furthermore, this will require two separate hoses, one for the water and one for the gelling agent.

According to the invention this problem is solved by using as a mixing chamber for the preparation of the gel a hose or pipe conduit serving to deliver the gel at a usage station, and by supplying said liquid and said gelling agent to the conduit in such proportions that a finished gel will be established near the output end of the conduit. In a preferred embodiment of the invention the original gelling agent is mixed with liquid in successive steps and a gel which is prepared before the conveying pipe or in the first part thereof and which has a relatively high content of the original gelling agent is used as gelling agent in said conduit wherein normally the final gel is prepared.

The invention is primarily based on realization of the fact that a gel will not cause any higher fall of pressure in a conveying pipe than true liquid does until said gel has been finished or fully built up and that the mixing of the liquid and the gelling agent caused by normal movements of flow in the pipe is sufficient for preparation of a gel.

The invention also concerns an apparatus for the gel preparation which comprises a mixing chamber for the gelation process formed by a hose or pipe conduit, which serves to deliver the gel at a usage station and is arranged to be supplied with a liquid and a gelling agent. In a preferred embodiment the conduit is used as a mixing chamber for the final gel and an additional mixing chamber is arranged before the conduit. Arranged parallel to this additional mixing chamber is an adjustable by-pass conduit feeding liquid to the main conduit.

Accordingly, the invention permits the use of a water gel also for such fire-fighting purposes where the fire-fighting substance has to be carried through hose conduits, without any higher pressure drops arising in the single conveying conduit or making it necessary to use two separate conduits and for the fire man to carry bulky additional equipments.

The invention will now be described more in detail, reference being made to the accompanying diagrammatic drawing which shows a preferred embodiment of an apparatus for gel preparation.

Although the invention is applicable for preparing different kinds of gels it will now be described for the preparation of a water gel intended for fire-fighting.

A water gel, especially intended for such use where it has to be transported in hose or pipe conduits is according to the invention prepared by mixing water and a gelling agent during the transport through a conduit. This requires among other things that the gel can be prepared at the same rate at which the water runs through the conduit. All substances which at mixing with water rapidly produces a gel may be used as gelling agents. One substance particularly adapted for this purpose is the organic gelling agent which has been described in the above mentioned Swedish Pat. No. 310,312. This gel comprises a surface active polyethylene oxide derivative and a volatilizable hydrocarbon oil which may be a light or a heavy oil. A suitable light oil is for instance white spirit or paraffin-oil. The surface-active polyethylene oxide derivative may comprise alkyl, aryl- or naphtyl polyglycol ethers. The surface active component in the gelling agent may amount to 10–70 percent. In the final water gel the concentration of the gelling agent may vary between 0.1 and 10 percent, preferably between 2 and 4 percent to cause a gel of desired consistency.

The gelling agent may be mixed with water in a single step but, preferably, this mixing is carried out in at least two steps in order to minimize the mixing work. As a matter of fact, the more water the gelling agent is mixed with the more mixing work is required before the gel structure is finished and, as in this case the mixing work is proportinal to the length of the conduit, it may in certain applications be necessary to carry out the mixing operation in several steps. However, according to the invention, the conduit used to deliver the gel at a usage station shall be used as a mixing chamber, independently of whether there are one or more mixing steps. The gelation process in this chamber is controlled so that the gel is finished not until at or near the output end of the conduit. Hereby, the problem above discussed and relating to the transport of a gel to a jet nozzle is solved in a simple manner. By making use of the movements of flow in the pipe for the mixing operation and by controlling the gelation as mentioned above the gel will be transported through the pipe without any difficulties due to pressure drop in the conveying conduit.

The gelation process has proved to be very stable which is why it is easy to control it so that the gel is fully built up first at the output end of the conduit. To obtain a gel structure at the output with about 2 percent gelling agent the conduit — which may be a standard hose used for fire-fighting — is preferably fed with a gelling agent consisting of a finished or almost finished gel structure having a higher content of the original gelling agent, about 10 percent, than the final gel. Preferably, this gel used as a gelling agent is obtained in a pre-mixing chamber arranged before the conduit, said chamber being fed with only a part of the total volume water but with the entire volume of gelling agent. This pre-mixing chamber is designed and fed with water in such a way that a substantially finished gel with a content of gelling agent of about 10 percent is obtained at its outlet in the conveying conduit where this gel structure is mixed with additional water. Hereby a new gelation process is started caused by the mixing of the gel with the water through the movement of flow in the conveying conduit and the new gel structure with lower content of gelling agent, preferably 2-4 percent, is successively built up in the conduit and finished at the output end thereof. This gelation process may be controlled in several ways, for instance by adjusting the mixing ration between gelling agent and water. This can be achieved by controlling the amount of additional water fed to the conveying conduit to become mixed with the substantially finished gel from the pre-mixing step. This control may be of any known manual or automatic type. A first coarse adjustment may be made dependent on the number of hoses of standard length used.

According to the invention an apparatus for preparing a water gel may simply consist of a normal fire-hose having its input end connected to a water supply and being provided with an inlet for receiving the gelling agent which is fed thereto by an adjustable pump or the like. The same input may be used both for water and gelling agent. By adjusting the amounts of water and gelling agent a water gel will successively be built up along the hose so that a finished gel structure is obtained near the output end of the hose. If necessary a number of additional hoses may be connected to the first one in which case said amounts have to be adjusted to match the new hose length. When a very short hose or pipe conduit is used or a gel with low content of gelling agent is desired it may be necessary to connect an additional mixing chamber before the conveying conduit. Said chamber may simply consist of an additional hose or pipe conduit, arranged to be fed with part of the water flow and the entire volume of gelling agent. If desired, one or more further chambers may be connected before or after the conveying conduit.

The drawing shows diagrammatically an apparatus according to the invention comprising two mixing chambers. Reference numeral 1 designates a valve to control the flow of water supplied to the apparatus from a pressure water supply such as a fire-pump or the ordinary water mains. Between said valve 1 and a hose conduit 2 serving to carry the gel to a usage station a pre-mixing step 3 is connected. This step consists of an inner pipe 5 arranged coaxially within an outer pipe 4 connected to valve 1. The inner pipe 5 is provided with an inlet 6 for gelling agent and mounted within pipe 4 by means of an annular wall 7. This wall serves as a support for the inner pipe and prevents water to pass through the space between the outer and inner pipes 4 and 5, respectively. The amount of gelling agent fed from a supply, not shown, is controlled by a valve 8. In this embodiment having an inner pipe 5 arranged within an outer pipe 4 only part of the water supplied via valve 1 will pass the inner pipe 5 which serves as a pre-mixing chamber. The remaining water will pass via a shunt pipe 9 which includes a valve 10.

The length of the inner pipe 5 is designed so that a finished or almost finished gel is obtained at its output end as a result of the mixing taking place in the pipe. The inner pipe will be of different length dependent on the desired content of gelling agent in the gel. By way of example, the inner pipe may have a length of about 6 metres and a diameter of 38 mm to produce a gel with about 10 percent gelling agent. However, this pipe does not have to be a rigid pipe but may consist of a hose or the like arranged in the outer pipe 4. The outer pipe may also be replaced by a hose. The water flowing through the shunt pipe 9 is mixed with the gel obtained at the outlet of the pipe 5. This mixture is supplied to the hose conduit 2 which is connected to the pre-mixing step 3 through ordinary coupling devices 11. The hose 2 may consist of one or more hoses of standard length having a jet nozzle 12 connected to the output end thereof. During the transport of the mixture through hose 2 a new gel structure will successively be built up in the hose. By controlling the water flow through shunt pipe 9 this gelation process can be controlled so that the gel is finished at or within the jet nozzle 12. Hereby, a gel is obtained at the nozzle without any difficulties having occurred during the transport in the hose. The apparatus described constitutes an attractive device for preparing water gels for fire-fighting purposes. It is of simple structure, reliable, easy to handle and requires only that for instance the fire-engines are provided with a pre-mixing chamber of the type described above. The apparatus does not interfere with the working capacity of the fire man, nor does it complicate the hose laying operation as hoses, coupling means and jet nozzles of standard type may be used.

The apparatus above described may be varied in different ways. Accordingly, the valves shown may consist of any known manually or automatically controlled devices. The valves controlling the flow of water through the shunt pipe and the amount of gelling agent may consist of gear pumps if high accuracy is desired. Furthermore, one pre-mixing chamber may be used for feeding a plurality of conveying conduits. Although the invention has been described for the preparation of water gels it may also be used for preparation of gels of other types. If required separate means may be arranged at or in the mixing chambers to produce more effective movements of flow therein. The common main principle of all embodiments is that a conveying conduit required for other purposes is used also as an important component in the gelation process.

I claim:

1. Method for continuously preparing and delivering a gel to a usage station by means of a conveying conduit comprising
    a. supplying to said conduit a liquid and a gel-forming substance having the capability of forming a gel when mixed with said liquid, and
    b. controlling the proportions between the supplied volume streams of said liquid and said gel-forming substance to cause the gelation process to occur substantially during the entire passage through said conduit as a result of admixture of said liquid and said gel-forming substance as they flow through said conduit whereby a finished gel is formed approximate the output end of said conduit and delivered from the output end of said conduit, whereby the pressure drop in the conduit is at substantially the same low level as when only said liquid is passed through said conduit.

2. The method of claim 1, wherein a portion of the total volume stream of the liquid supplied to said conduit is mixed with a gelling agent in at least one preparatory step to form a gelling mixture having a higher content of gelling agent than is desired in the final gel, and said gelling mixture of relatively high concentration is then supplied to the conduit as said gel-forming substance for the gelation process occurring in said conduit.

3. The method of claim 1 wherein said liquid is water; wherein said gel-forming substance is in an about between 2 and 4 percent of the total amount of said water and said gel-forming substance.

4. Method for continuously preparing and delivering a water gel to a usage station by means of a conveying conduit comprising
 a. mixing water and an emulsifying type gel-forming agent to form a gelling mixture,
 b. supplying (i) said gelling mixture and (ii) additional water to said conduit, and
 c. controlling the proportion of said additional water and said mixture to cause the galation process to occur substantially during the entire passage through said conduit as a result of admixture of said additional water and said gelling mixture as they flow through said conduit whereby a finished gel is formed approximate the output end of said conduit and delivered from the output end of said conduit, whereby the pressure drop in the conduit is at substantially the same low level as when only water is passed through said conduit.

5. The method of claim 4 wherein said gelling mixture contains about 10 percent of said gel-forming agent, and wherein the amount of said additional water is sufficient so that said gel-forming agent is between about 2 and 4 percent of the total of said gelling mixture and of said additional water.

6. The method of claim 5 wherein said gel-forming agent comprises between 10 and 70 percent of a surface active agent and the remainder being a volatilizable hydrocarbon oil.

* * * * *

UNITED STATES PATENT OFFICE
CERTIFICATE OF CORRECTION

Patent No. 3,739,794          Dated June 19, 1973

Inventor(s) MATS E. G. LINDGREN

It is certified that error appears in the above-identified patent and that said Letters Patent are hereby corrected as shown below:

Cover page, left column, the line following:

"[30] Foreign Application Priority Data" should read

--Sept. 14, 1970   Sweden..........12466/70--.

Signed and sealed this 16th day of April 1974.

(SEAL)
Attest:

EDWARD M. FLETCHER, JR.          C. MARSHALL DANN
Attesting Officer                Commissioner of Patents